(12) United States Patent
Buchheim et al.

(10) Patent No.: US 8,878,671 B2
(45) Date of Patent: Nov. 4, 2014

(54) LOCATOR BEACON AND RADAR APPLICATION FOR MOBILE DEVICE

(71) Applicants: James Buchheim, Aventura, FL (US); Arne Hennig, Davie, FL (US)

(72) Inventors: James Buchheim, Aventura, FL (US); Arne Hennig, Davie, FL (US)

(73) Assignee: SSI America, Inc., Fort Lauderdale, FL (US)

( * ) Notice: Subject to any disclaimer, the term of this patent is extended or adjusted under 35 U.S.C. 154(b) by 0 days.

(21) Appl. No.: 13/858,053

(22) Filed: Apr. 7, 2013

(65) Prior Publication Data

US 2014/0135041 A1 May 15, 2014

Related U.S. Application Data

(63) Continuation-in-part of application No. 13/848,095, filed on Mar. 21, 2013.

(60) Provisional application No. 61/726,613, filed on Nov. 15, 2012.

(51) Int. Cl.
*G08B 1/08* (2006.01)
*H04W 4/02* (2009.01)

(52) U.S. Cl.
CPC .................................... *H04W 4/02* (2013.01)
USPC ............... 340/539.13; 455/456.1; 455/456.5; 455/456.6

(58) Field of Classification Search
USPC .......................................... 455/456.1, 456.4
See application file for complete search history.

(56) References Cited

U.S. PATENT DOCUMENTS

| | | | |
|---|---|---|---|
| 2003/0034887 A1* | 2/2003 | Crabtree et al. | 340/539 |
| 2004/0160917 A1* | 8/2004 | Eliznd et al. | 370/334 |
| 2007/0184852 A1* | 8/2007 | Johnson et al. | 455/456.1 |
| 2007/0291589 A1* | 12/2007 | Kawabata et al. | 367/88 |
| 2011/0012775 A1* | 1/2011 | Richards et al. | 342/146 |

* cited by examiner

*Primary Examiner* — Steven Lim
*Assistant Examiner* — Omeed Alizada
(74) *Attorney, Agent, or Firm* — Mark M. Friedman (57) ABSTRACT

A locator device and system including (a) a beacon, configured to be located via a wireless means; and (b) an adhesive means, adapted to adhere the beacon to a substantially flat surface, wherein the beacon is configured to be tracked by a mobile device running a mobile application adapted to locate the beacon via the wireless means.

28 Claims, 4 Drawing Sheets

LOCATOR BEACON AND RADAR APPLICATION FOR MOBILE DEVICE

FIELD AND BACKGROUND OF THE INVENTION

The present invention relates to a coin sized attachable beacon (also referred to herein as 'Stick-N-Find', 'Stick-N-Find Beacon', 'sticker beacon', 'bluetooth sticker', 'beacon', or 'sticker') equipped with Bluetooth communication abilities and preferably with Bluetooth Low Energy (BLE) communication abilities. The beacon can be adhered or attached to any device, person or animal, etc. and can be located using a mobile computing and communications device running a complementary application.

DEFINITION

Bluetooth Low Energy (BLE) is a feature of Bluetooth 4.0 wireless radio technology, aimed at new, principally low-power and low-latency, applications for wireless devices within a short range (up to 50 meters/160 feet). This facilitates a wide range of applications and smaller form factor devices.

One important difference between BLE and Classic Bluetooth is that, to obtain simpler and cheaper radio chipsets, BLE uses only 40 channels, 2 MHz wide, while Classic Bluetooth uses 79 channels, 1 MHz wide. Three of these channels, which are located exactly between the Wireless LAN channels, are used for device discovery and connection setup. These channels (also known as "advertising" channels) are used by the technology to search for other devices or promote its own presence to devices that might be looking to make a connection. In comparison, Classic Bluetooth technology uses 32 channels for the same task. This drastic reduction is one more trick that BLE uses to minimize time on air, so as to reduce power consumption. BLE has to switch "on" for just 0.6 to 1.2 ms to scan for other devices using its three advertising channels. Classic Bluetooth, instead, requires 22.5 ms to scan its 32 channels. The power savings are significant: BLE consumes 10 to 20 times less power than Classic Bluetooth technology to locate other radios.

SUMMARY OF THE INVENTION

According to the present invention there is provided a coin sized, adhesive, locator beacon using Bluetooth Low Energy communication coupled with a mobile application for a smartphone/Tablet computer/Laptop. The application offers various features including: a radar screen for determining distance between device and locator beacon; a Virtual Leash, which sounds an alarm if a selected beacon goes beyond a predefined distance from the device; a Find It feature which sounds an alarm when a selected beacon comes back into range; and a Task Launcher which is capable of causing certain changes to mobile devices when they come within range of the beacon, e.g. a beacon placed at the door to a conference room causes mobile devices passing by to go into 'Silent' mode.

According to the present invention there is provided a locator device including (a) a beacon, configured to be located via a wireless means; and (b) an adhesive means, adapted to adhere the beacon to a substantially flat surface, wherein the beacon is configured to be tracked by a mobile device running a mobile application adapted to locate the beacon via the wireless means.

According to further features in preferred embodiments of the invention described below the wireless means is Bluetooth Low Energy (BLE) technology.

According to still further features the wireless means is Bluetooth technology.

According to still further features the wireless means is WiFi technology.

According to still further features the wireless means is satellite technology.

According to still further features the wireless means is cellular voice technology.

According to still further features the wireless means is cellular data technology.

According to still further features the device further includes: (c) an audio unit, adapted to emit an audible sound upon receiving a corresponding instruction from According to still further features the device further includes: (c) an illumination unit, adapted to emit a visual alert upon receiving a corresponding instruction from the mobile device.

According to still further features the device further includes: (c) a key fob adapted for being adhered to the beacon via the adhering means, the key fob adapted for operationally coupling the beacon to objects having non-flat surfaces, via an eyelet in the key fob.

According to still further features the mobile application includes a Radar Screen feature, wherein when the beacon is wirelessly coupled to the mobile device, the mobile application displays a representation of the beacon on the mobile device relative to a distance of the beacon from the mobile device.

According to still further features the distance of the beacon from the mobile device is calculated upon receiving at least one Received Signal Strength Indicator (RSSI) value from the beacon, wherein the at least one RSSI value is measured on said beacon. According to further features, the distance is further calculated based on at least one RSSI value measured on said mobile device.

According to still further features the distance of the beacon from the mobile device is calculated upon receiving between one and three Received Signal Strength Indicator (RSSI) values, measured on the beacon, from the beacon and calculating an average distance based on the received RSSI values.

According to still further features the distance of the beacon from the mobile device is calculated upon receiving at least one Received Signal Strength Indicator (RSSI) value for at least one of the thirty seven communication channels measured on the beacon from the beacon and calculating an average distance based on the received RSSI values.

According to still further features the distance of the beacon from the mobile device is calculated upon receiving at least one Received Signal Strength Indicator (RSSI) value for at least one of all 40 channels measured on the beacon from the beacon and calculating an average distance based on the received RSSI values.

According to still further features the mobile application includes an audio alert feature, wherein when the beacon is wirelessly coupled to the mobile device, the mobile application is adapted to send an instruction to the beacon, instructing the audio unit to emit an audible sound.

According to still further features the mobile application includes a visual alert feature, wherein when the beacon is wirelessly coupled to the mobile device, the mobile application is adapted to send an instruction to the beacon, instructing the illumination unit, to emit a visual alert.

According to still further features the mobile application includes a Find It feature wherein when the beacon is wirelessly coupled to the mobile device and located outside of a range detectable via the wireless means of the mobile device, the mobile application is adapted to issue an alert when the beacon comes back into range of the mobile device.

According to still further features the mobile application includes a virtual leash feature wherein when the beacon is wirelessly coupled to the mobile device and moves farther away from the mobile device than a predefined distance selected on the mobile application, then the mobile application is adapted to issue an alert.

According to still further features the mobile application includes a task launcher feature, wherein when the mobile device is within a predefined range, the beacon is configured to effect a functional change on the mobile device.

According to still further features the functional change is selected from the group including: activating an alert, changing an alert mode vis-à-vis receiving communications, changing a functional setting, and powering down the mobile device.

According to still further features the beacon has a diameter approximately equivalent to a diameter of an American Quarter Dollar coin and a thickness of ⅛ of an inch.

According to still further features the distance is calculated based on signal strength information.

According to still further features the mobile application calculates a direction in which the beacon is located relative to the mobile device based on signal strength information.

According to still further features the mobile application calculates a direction in which the beacon is located relative to the mobile device based on relative phase information.

According to another embodiment there is provided a monitoring system including: (a) at least one locator beacon; and (b) a mobile application for managing the at least one locator beacon.

According to further features the mobile application is adapted to manage a plurality of the at least one locator beacon.

The present invention discloses an innovative beacon that has a communicating range of about 100 to 160 feet (approximately 30 to 50 meters) which can be tracked using an application on a mobile device such as a smart phone. The beacon includes a battery that lasts for over a year. Battery can be replaced without removing the beacon from the surface to which it is adhered.

Additionally the Stick-N-Find beacons have a buzzer and light, allowing the beacon to be located easily even in the dark.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a Bluetooth enabled beacon and mobile app according to the present invention may be better understood with reference to the drawings and the accompanying description.

Beacon

Figure 1A:
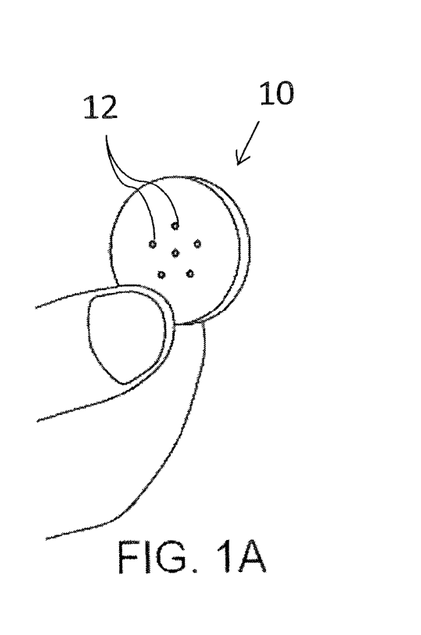
FIG. 1A is a pictorial depiction of a front view of an embodiment of the innovative sticker beacon.
Figure 1B:
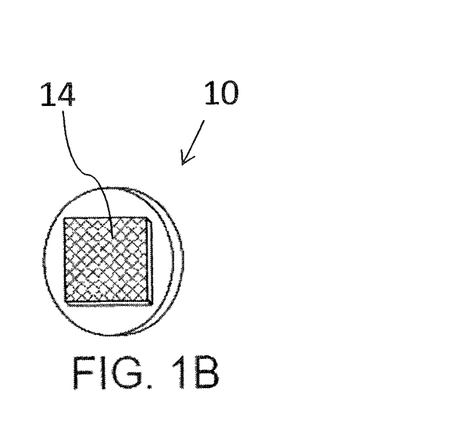
FIG. 1B is a pictorial depiction of a back view of the embodiment of FIG. 1.

Referring now to the drawings, FIG. 1A illustrates a pictorial depiction of an isometric front view of an innovative sticker beacon 10 held between a person's fingers. FIG. 1B is an isometric back view of sticker beacon 10. Referring to both FIGS. 1A and 1B, beacon 10 include integrated speaker holes 12. Speaker holes 12 allow sound from an integrated buzzer (not shown here) to be heard. Speaker holes 12 also allow an integrated LED (not shown here either) to be seen when active. An adhesive means 14 is visible mounted on the back of beacon 10. Sticker beacon 10 can be attached to virtually any substantially flat surface with the aid of adhesive 14. Preferably, the sticker beacon is non-removeably attached to the desired surface via the adhesive. The relatively small size of sticker 10 together with adhesive backing 14 allows the sticker to be used in a wide variety of situations.

Preferably the adhesive used is 3M® VHB® or equivalent adhesive. 3M® VHB® adheres to most surfaces and achieves a full strength bond in approximately one hour. Preferably the adhesive is capable of adhering to surfaces including at least: glass, painted surfaces, metal, painted/sealed wood & concrete, outdoor & harsh environmental applications, plastics, leather, etc.

Figure 2:
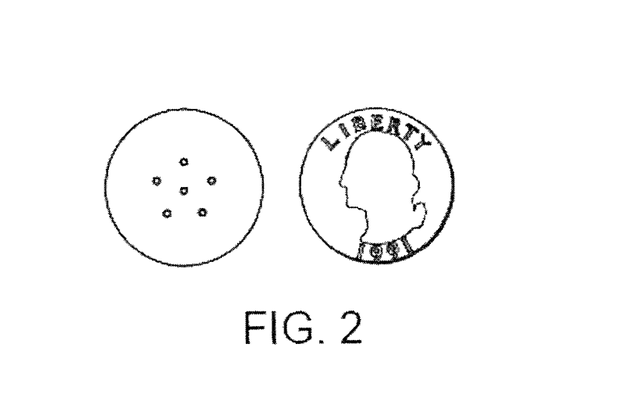
FIG. 2 is a pictorial representation of the innovative beacon sticker of the immediate invention shown next to a US quarter Dollar coin.
Figure 3A:
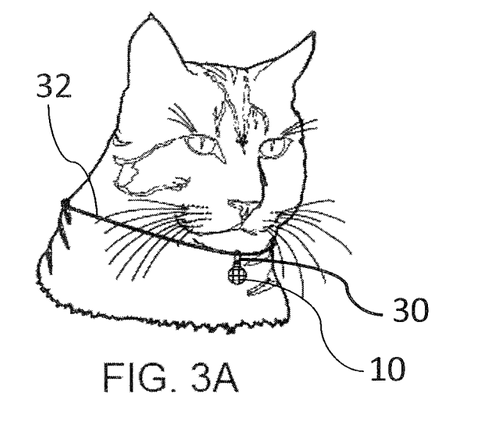
FIG. 3A-3D are pictorial depictions of the innovative beacon in use.
Figure 3B:
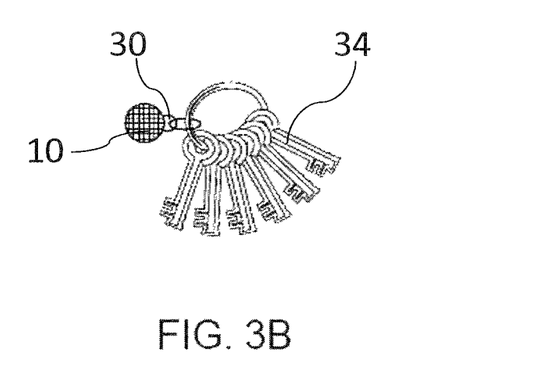
Figure 3C:
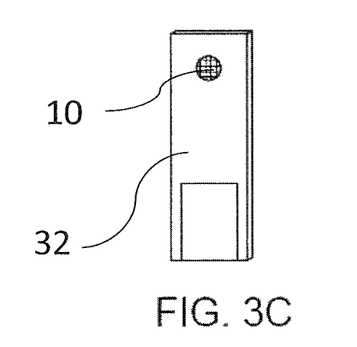
Figure 3D:
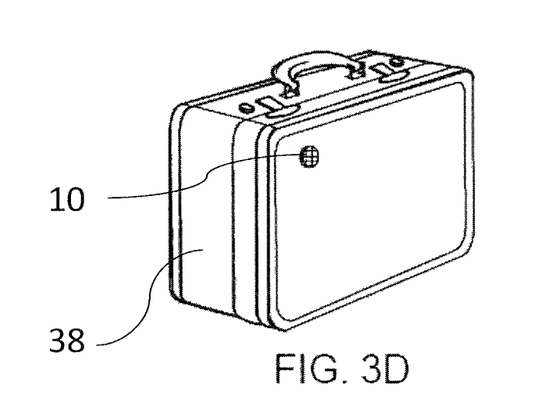

FIG. 2 is a pictorial representation of the innovative beacon sticker of the immediate invention shown next to a US quarter Dollar coin. The size of the currently depicted embodiment of sticker 10 is clear from the context of the comparison between sticker 10 and a quarter Dollar coin 20 depicted in FIG. 2.

FIGS. 3A to 3D are pictorial depictions of the innovative beacon in use. The beacon is about the size of an American Quarter Dollar coin (see FIG. 2) and ⅛ of an inch (3.5 mm) thick. The dimensions of the beacon allow the device to be attached unobtrusively to most objects. For example, sticker beacon 10 can be adhered to a TV remote control 32 (see FIG. 3C), a set of keys 34 (when mounted on a fob 30) (see FIG. 3B), a pet collar 36 (see FIG. 3A—also mounted on a fob 30), a suitcase 38 (see FIG. 3D) or any other object that is often looked for.

Figure 4:
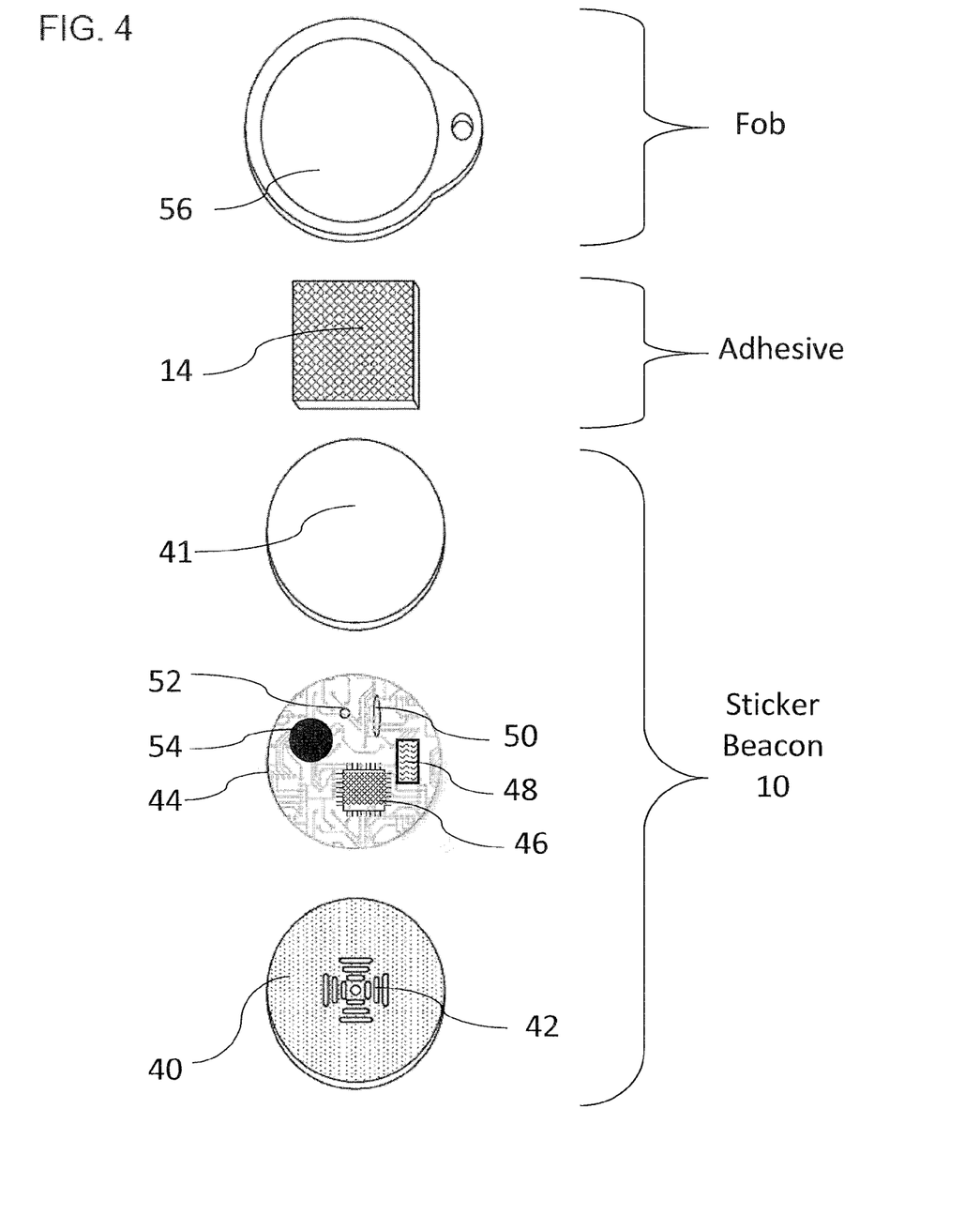
FIG. 4 is a semi-schematic exploded view of an embodiment of the innovative sticker beacon and a key-ring fob.

FIG. 4 is a semi-schematic exploded view of an embodiment of the innovative sticker beacon 10 and a key-ring fob 30. In the Figure, a front cover 40 includes speaker holes 42 (similar in function to speaker hole 12 of FIG. 1, although having a slightly different configuration). A back cover 41 is adapted fittingly close together with front cover 40.

A round circuit board 44 is enclosed by back and front covers 40/41 of the sticker 10. Circuit board 44 includes a computing chip 46 for effecting all relevant the processing logic. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A wireless communication component 48 effects all Bluetooth and BLE related functionality (e.g. sending and receiving signals/data etc.). In some embodiments, component 48 is capable of effecting other types of wireless communication (all well known in the art) in addition to, or in place of, Bluetooth communication. An LED 50 (or other illumination means) emit a visual alert (such as emitting a solid light or flashing alert) in accordance with relevant or corresponding instructions (discussed below). In some embodiments, light from LED 50 is visible through speaker holes 42. In other embodiments, illumination from LED 50 is visible through a transparent section (not shown) of either front cover 40 or back cover 41 or area of connection between the two. An audio component 52 enables sticker 10 to emit an audible sound such as a buzzer. Both the illumination function and sound function enhance the user's ability to find the beacon, as will be discussed in further detail below. A battery 54, such as a watch battery or button cell, is replaceably attached to board 44. In some preferred embodiments of the invention battery 54 is capable of working approximately thirty minutes per day for one year. Of course the longevity of the battery life is dependent on a myriad of factors such as environmental factors, use, exact battery type, manufacture and many more. It is to be understood that the depicted size and shape of battery 54 are merely exemplary and in no way limiting. Furthermore, the location, shape, size, etc. of any of the aforementioned components on circuit board 44 are merely exemplary or representative of the named components and not intended to be limiting. It is also to be understood that circuit board 44 includes additional elements and/or variations of the named components and/or combinations of the represented components. Therefore, the depicted components are merely representative of components capable of fulfilling the described functions.

Adhesive means 14 is adapted to be attached to back cover 41 and further adapted to adhere to almost any substantially flat surface. A key fob (or 'keychain holder', keychain fob, key-ring fob or simply 'fob' as referred to hereinafter) 56 is an optional addition to sticker beacon 10. Fob 56 allows sticker 10 to be attached to objects that do not have useable flat surfaces. For example, a set of keys cannot comfortably house a Bluetooth sticker 10 unless the sticker is attached to fob 56 and mounted on the key-ring. Fob 56 includes an eyelet 58 which allows the fob to be mounted on a key-ring, thread, necklace etc. This enables the sticker to be very small, without any keychain hole. Sticker 10 is mounted on fob 56 with adhesive 14. While the invention has been described with respect to a round form, it is made clear that any appropriate shape that is capable of housing the same or substantially similar components is included within the scope of the invention.

Mobile Application

The mobile application is preferably adapted for use on a cellular mobile communication device such as a smart phone. More preferably, the application is adapted for use on a smart phone enabled with Bluetooth technology, and most preferably with a mobile device enabled with Bluetooth Low Energy (BLE) capabilities. Of course, the mobile application can be installed and run on any mobile/handheld device designed and configured to support the mobile application (e.g. iPad™, iPod™, mini-iPad™, tablet computer, PDA and the like).

Furthermore, although less preferable, in some embodiments of the invention, the mobile application is supported on mobile platforms (smart phones, PDAs, Tablet computers etc.) which are only Bluetooth (versions 1.0 to 3.0) enabled, not Bluetooth Low Energy (version 4.0) enabled. In such embodiments, the corresponding beacon(s) locatable by the devices are also/alternatively Bluetooth 1.0-3.0 enabled and/or compatible.

In some further embodiments (not shown), the beacon is alternatively or additionally WiFi enabled, allowing the beacon to be tracked via the WiFi signal using an embodiment of the mobile application adapted to locate the beacon using WiFi. In some embodiments sticker 10 additionally and/or alternatively includes a cellular communications component capable of effecting (receiving and/or sending) cellular voice (i.e. telephonic) or data (wireless cellular data) communication. In some embodiments, sticker 10 alternatively and/or additionally includes a component capable of satellite and/or GPS communication (i.e. communication with a GPS and/or GPS-like satellites).

The innovative mobile application includes computer-readable instruction/logic embodied in software and/or firmware and/or hardware and stored on computer-readable memory component. Such a memory component may be a read-only memory, random access memory, non-volatile memory, volatile memory, static memory, dynamic memory, flash memory, cache memory, and/or any device that stores digital information. The computer-readable instructions/logic can be process by an appropriate processing unit. The innovative application includes, at least the following features:

Radar Screen

Figure 5:
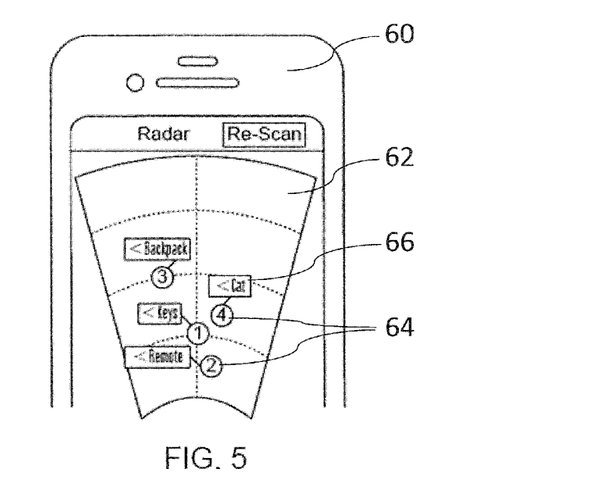
FIG. 5 is a partial screen shot of a smart phone running an innovative 'Radar Screen' feature of the mobile application of the present invention.

The first feature is a simple Radar Screen. FIG. 5 is a partial screen shot of a smart phone running a 'Radar Screen' feature of the mobile application of the present invention. When activating the Radar Screen feature on a mobile device 60 running the innovative application, some or all of the beacons/objects in range on a radar-type screen 62. Of course, as Bluetooth cannot show direction, radar screen 62 approximates the distance from the mobile device to Stick-N-Find 10, but not the direction. Therefore, once the beacon of the object being sought appears on Radar Screen 62, then walking in a specific direction, will give an indication of whether phone 60 is coming closer to the beacon or moving farther away. In this manner, the user is able to deduce which direction is the correct direction to follow and move in the appropriate direction until the beacon/object is located (very much like the hot/cold game children play, where an object is hidden and the seeker is 'directed' to the object with hints in the form of varying degrees of temperature as a guide: warm, hot being close and cool, cold being far—as is well known). Each beacon 10 that is paired with phone 60 can be labeled with a name tag 66 for easy recognition.

Distance between Bluetooth sticker 10 and phone 60 is measured using Received Signal Strength Indicator (RSSI) values. RSSI is a measurement of the power present in a received radio signal. In one embodiment, the RSSI values of phone 60 provide the distance measurement. This is a less preferred embodiment, as phone signal reception is not optimal. In other, more preferred embodiments, RSSI levels on sticker 10 are measured for distance values. Sticker 10 is paired to phone 60 and measures RSSI levels from sticker 10 to phone 60. Sticker 10 then sends the data over bluetooth to phone 60. Therefore, when phone 60 displays the approximate distance between sticker 10 and phone 60, radar-screen 62 is really displaying the RSSI values measured at the sticker, then sent to phone. Not the RSSI values measured at the phone. In other embodiments any combination of RSSI values from both the phone and the sticker can be processed to provide a more accurate result.

As mentioned above, Bluetooth Low Energy uses 40 channels. Out of those 40 channels, up to 37 channels are used during an active connection and 3 channels are used for advertising. Because of different signal attenuation for each of those channels there is usually a difference between the RSSI values of each channel. Therefore, in an even more preferable embodiment, the innovative application uses RSSI values measured independently for each channel and combines the values in order to receive an average value. The averaging operation performed on the RSSI values takes into account the different characteristics of each channel. The average value is more accurate and reliable than results for any single RSSI value.

The averaging process can be performed on up to 37 channels when there is an active connection between the phone and the sticker. During scanning, the sticker can transmit different data packets for each of the 3 advertising channels. This enables the phone to do the same kind of processing mentioned above, for those 3 advertising channels (i.e. receiving RSSI values from up to 3 channels). In the event that the signal is not good enough for an active connection between the Sticker and the Phone, the application in the phone will fall back to scan mode, and try to estimate distance based on RSSI values from at least one of the advertising channels.

In another embodiment, if the sticker is in the advertising mode it can broadcast the RSSI values measured using the packets sent to the phone, as a broadcasted response to the scan request. This means the Sticker response to the phone would contain the RSSI measurement from the phone.

In some embodiments the averaging procedure mentioned above can be done on any of the 40 available channels. That is to say that RSSI values can be received from between 1 and 40 channels and an average value calculated from the received RSSI values will give the most accurate measure of distance.

In some embodiments of the invention, the sticker has an Advertising Mode where the signal can be picked up by the phone. When the phone is in scanning mode it picks up the signal from the beacon.

In some embodiments, when the sticker is actively connected to the phone, the sticker is in a Connectivity Mode. In the connectivity mode, the sticker can communicate with the phone over the other 37 communication channels.

In some special cases the three advertising channels can also be used for communication in broadcast communication mode.

Buzz-Flash

When an indication icon 64 of a beacon 10 appears on radar screen 62, a user can touch/tap or otherwise select a desired beacon-icon 64 on the screen and send a command signal to the corresponding beacon. One such command signal instructs the selected sticker to emit an auditory noise (e.g. make a buzzing sound or the like). In some embodiments, speaker 52 facilitates this auditory function. When the selected bluetooth sticker 10 makes a noise, the user can more easily locate the beacon.

Another command signal instructs a selected beacon 10 to emit some form of illumination such as flashing (i.e. light up LED 50 in beacon 10). The 'flash' function is useful when making a noise is either inconvenient or ineffective. Of course the 'buzz' function or 'flash' function can be used either separately or together.

Find It

Figure 6:
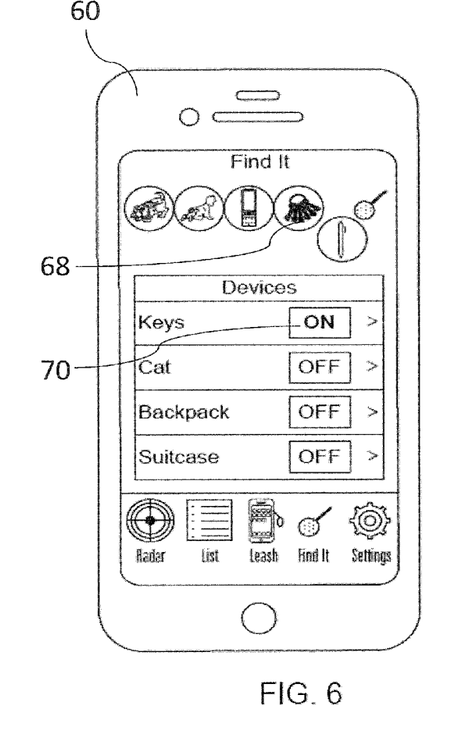
FIG. 6 is a screen shot of a smart phone running a 'Find It' feature of the innovative mobile application.

FIG. 6 is a screen shot of a smart phone 60 running a 'Find It' feature of the innovative mobile application. The "Find IT" Feature is used when searching for a missing sticker 10, i.e. when the beacon is not in range of phone 60. A user activates a find feature for a desired object/beacon 68 by selecting a switch 70 for the tagged object. Once the desired beacon comes back into range, then phone 60 issues an alert. The alert notifies the user that the beacon is back in range.

An example where the Find It feature can be useful is when a user sticks a Stick-N-Find beacon 10 on a piece of baggage 38 (see FIG. 3D) which is checked-in on a flight. When the suitcases start coming out onto the conveyer belt, the user can simply sit down and wait comfortably on the side. When the piece of baggage comes into range, phone 60 issues an alert, signaling to the user that baggage 38 is near. Only at this point does the user need to get up, and take the luggage. A user can also stick a Stick-N-Find 10 on his wife's car. Once she pulls into the driveway, the user gets a notification, cleans his mess, and goes to wash dishes before she comes in.

Virtual Leash

Figure 7:
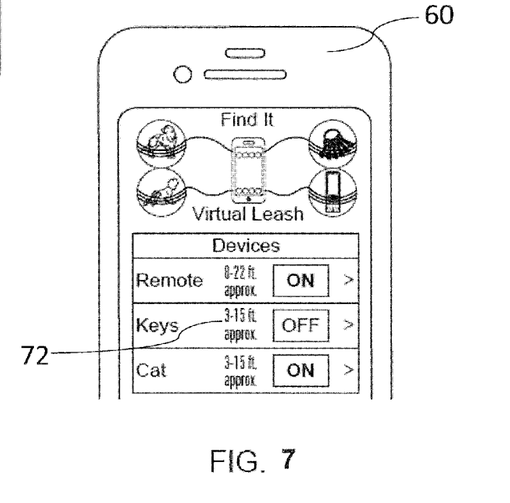
FIG. 7 is a partial screen shot of a smart phone running a 'Virtual Leash' feature of the innovative mobile application.

FIG. 7 is a partial screen shot of a smart phone running a 'Virtual Leash' feature of the innovative mobile application. The Virtual Leash feature allows a user to create a 'virtual leash' on a selected beacon 10, so that if the beacon (e.g. a sticker threaded on the shoe laces of a child) moves farther away than a selected approximate distance 72 from phone 60, the application issues an alarm from the phone. In essence, the Virtual Leash feature is the opposite of the Find It feature.

Different types of alarms can be selected and unique ala is can be selected for each beacon 10 (e.g. a chime sounds if your handbag is distanced from your phone, but when a pet is out of range, then a message flashes on the screen of the phone and if a child is out of range then a siren alarm is issued). In some preferred embodiments, Virtual Leash is a two way function, where both beacon 10 and phone 60, can issue an alert. For example, should a user have car keys in his pocket but leave the phone on the kitchen table, then both the phone and sticker will buzz and/or flash when out of range from each other. In this manner, it is the beacon that alerts the user to fact that he has left the phone in the house. Of course there are situations where it is preferable to active the alarm on only one of the two components (e.g. only activate alerts on the phone but not on a beacon connected to a child's shoe or a pet collar).

Task Launcher

An optional feature of the innovative application is a Task Launcher Feature. Task Launcher is capable of causing certain changes to mobile devices when they come within range of the beacon. For example a beacon 10 can be placed at the door to a conference room causes mobile devices passing by to go into 'Silent' mode.

Directional Antenna(E) and Triangulation

Figure 8:
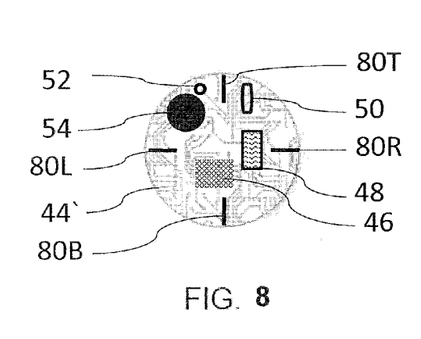
FIG. 8 is a schematic diagram of a further embodiment of circuit board of a locator beacon of the immediate invention.

FIG. 8 depicts a schematic diagram of a further embodiment of a circuit board 44' of a locator beacon 10' of the immediate invention. In the further preferred embodiment, beacon 10' includes all the components of circuit board 44 described in reference to FIG. 4 and further includes four directional antennae 80. One directional antenna 80 located in each of the cardinal points on circuit board 44'. Exemplarily, top antenna 80T is positioned in the north, bottom antenna 80B is positioned in the south, right antenna 80R is positioned in the east and left antenna 80L is positioned in the west. Of course these reference names and locations are only exemplary and could be substituted for other names in other positions. Each antenna transmits a different MAC address or ID, so that the phone/application can calculate which Mac Address had the highest RSSI value. The phone will then know if it is up, down, left or right relative to the Sticker.

In some embodiments which include a plurality of directional antennae (i.e. two or more antennae), top cover 40 further includes an indicator mark indicating how the sticker should be orientated. If the orientation of the beacon is known then the positions of the directional antennae 80 are known, allowing the phone to know in which direction the beacon is located (as mentioned in the previous embodiment).

In further embodiments, the application can process the distance and/or direction using various combinations of RSSI values from sticker and/or the phone, as discussed above in relation to the distance function.

In a case where a given sticker is located near a number of other stickers, it may be possible for the mobile application on the phone to triangulate the position of the given sticker.

In other embodiments, signal strength and phase information are analyzed and processed using various techniques. Analyzing and processing phase measurements (MIMO, BeamForming) improve accuracy of detecting both distance and direction. That is to say that phase control improves control over directional transmissions making the transmission is a desired direction more accurate. Coupling this technology with the aforementioned idea of transmitting multiple MAC/ID information increases the directional accuracy of the scanning feature.

Handling Multiple Beacons on a Single Mobile Device

The innovative application can manage multiple Stick-n-Find beacons 10 simultaneously. A definitive upper limit is not set by the mobile application, although beyond a certain number (e.g. twenty), the screen becomes too cluttered to be effectual. The number of beacons that can be managed can vary depending on the platform hosting the application. The application can locate all of the beacons at the same time.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A locator device comprising:
    (a) a beacon, configured to be located via a wireless means; and
    (b) an adhesive means, adapted to non-removeably adhere said beacon to a substantially flat surface, wherein said beacon is configured to be tracked by a mobile device running a mobile application adapted to locate said beacon via said wireless means, and
    wherein a distance between said mobile device and said beacon is calculated on said mobile device based on a combination of at least one Received Signal Strength Indicator (RSSI) value measured on said beacon and sent from said beacon to said mobile device and at least one said RSSI value measured on said mobile device.

2. The device of claim 1, wherein said wireless means is Bluetooth Low Energy (BLE) technology.

3. The device of claim 2, wherein said mobile application includes a Radar Screen feature, wherein when said beacon is wirelessly coupled to said mobile device, said mobile application displays a representation of said beacon on said mobile device relative to said distance of said beacon from said mobile device.

4. The device of claim 3, wherein said distance of said beacon from said mobile device is calculated upon receiving between one and three Received Signal Strength Indicator (RSSI) values, measured on said beacon, from said beacon and calculating an average distance based on said received RSSI values.

5. The device of claim 1, further comprising:
    (c) a plurality of directional antennae operationally coupled to said beacon, wherein each said directional antenna transmits a unique identifier.

6. The device of claim 5, wherein each said directional antenna further transmits at least one Received Signal Strength Indicator (RSSI) value.

7. The device of claim 6, wherein said mobile application calculates a direction in which the locator beacon is located relative to said mobile device based on relative strengths of said RSSI values received respectively from each of said directional antennae, wherein a highest said relative strength indicates said direction.

8. The device of claim 5, wherein said plurality of directional antennae includes four cardinally located said directional antennae.

9. The device of claim 1, further comprising:
    (c) an illumination unit operationally coupled to said beacon, adapted to emit a visual alert upon receiving a corresponding instruction from said mobile device.

10. The device of claim 9, wherein said mobile application includes a visual alert feature, wherein when said beacon is wirelessly coupled to said mobile device, said mobile application is adapted to send an instruction to said beacon, instructing said illumination unit, to emit a said visual alert.

11. The device of claim 1, wherein said mobile application includes a Find It feature wherein when said beacon is wirelessly coupled to said mobile device and located outside of a range detectable via said wireless means of said mobile device, said mobile application is adapted to issue an alert when said beacon comes back into said range of said mobile device.

12. The device of claim 1, wherein said mobile application includes a virtual leash feature wherein when said beacon is wirelessly coupled to said mobile device and moves farther away from said mobile device than a predefined distance selected on said mobile application, said mobile application is adapted to issue an alert.

13. The device of claim 1, wherein said mobile application includes a task launcher feature, wherein when said mobile device is within a predefined range, said beacon is configured to effect a functional change on said mobile device.

14. The device of claim 13, wherein said functional change is selected from the group including: activating an alert, changing an alert mode vis-à-vis receiving communications, changing a functional setting, and powering down said mobile device.

15. The device of claim 1, wherein said beacon has a diameter approximately equivalent to a diameter of an American Quarter Dollar coin and a thickness of ⅛ of an inch.

16. The device of claim 3, wherein said distance of said beacon from said mobile device is calculated upon receiving at least one Received Signal Strength Indicator (RSSI) value for at least one of the thirty seven communication channels measured on the beacon from said beacon and calculating an average distance based on said received RSSI values.

17. The device of claim 3, wherein said distance of said beacon from said mobile device is calculated upon receiving at least one Received Signal Strength Indicator (RSSI) value for at least one of all 40 channels measured on the beacon from said beacon and calculating an average distance based on said received RSSI values.

18. The device of claim 1, wherein said wireless means is selected from the group consisting of: cellular voice technology, cellular data technology, Bluetooth technology, WiFi technology and satellite technology.

19. The device of claim 3, wherein said distance is calculated based on signal strength information.

20. The device of claim 1, wherein said mobile application calculates a direction in which said beacon is located relative to said mobile device based on signal strength information.

21. The device of claim 20, wherein said mobile application further calculates said direction based on relative phase information.

22. The device of claim 1, wherein said mobile application calculates a direction in which said beacon is located relative to said mobile device based on relative phase information.

23. A monitoring system, comprising:
   (a) at least one locator beacon of claim 1; and
   (b) a mobile application for managing said at least one locator beacon.

24. The monitoring system of claim 23, wherein said mobile application is adapted to manage a plurality of said at least one locator beacon.

25. The device of claim 1, wherein said at least one RSSI value is an average value calculated based on signals received from said mobile device over a plurality of channels, wherein said average value is calculated using an averaging operation which takes into account different characteristics of each of said plurality of channels.

26. The device of claim 1, wherein said at least one RSSI value measured on said mobile device is an average value calculated based on signals sent from said beacon over a plurality of channels, wherein said average value is calculated using an averaging operation which takes into account different characteristics of each of said plurality of channels.

27. The device of claim 1, wherein said at least one RSSI value measured on said beacon is broadcast by said beacon using packets sent to said mobile device in response to a scan request sent from said mobile device.

28. The device of claim 5, wherein said unique identifier is a MAC address.

* * * * *